(12) United States Patent
Russell et al.

(10) Patent No.: US 6,384,953 B1
(45) Date of Patent: May 7, 2002

(54) MICRO-DYNAMIC OPTICAL DEVICE

(75) Inventors: Stephen D. Russell; Randy L. Shimabukuro, both of San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 42 days.

(21) Appl. No.: 09/607,579

(22) Filed: Jun. 29, 2000

(51) Int. Cl.⁷ .................................................. G02F 1/03
(52) U.S. Cl. ...................... 359/245; 359/254; 359/260; 359/263; 359/267
(58) Field of Search ............................... 359/585, 578, 359/579, 245, 263, 254, 250, 298, 318, 320, 322, 222, 586, 588, 584, 267, 260; 349/105, 106, 196

(56) References Cited

U.S. PATENT DOCUMENTS

| | | | |
|---|---|---|---|
| 4,451,123 A | 5/1984 | MnNeill et al | 359/247 |
| 4,583,818 A | 4/1986 | Chen et al. | 359/585 |
| 4,686,519 A | 8/1987 | Yoshida et al. | 348/744 |
| 4,740,785 A | 4/1988 | Stroomer et al. | 359/359 |
| 4,896,948 A | 1/1990 | Dono et al. | 345/332 |
| 4,965,562 A | 10/1990 | Verhulst | 345/85 |
| 5,011,250 A | 4/1991 | Okada et al. | 359/245 |
| 5,347,395 A | 9/1994 | Lautenschlager et al. | 345/85 |
| 5,570,139 A | 10/1996 | Wang | 345/88 |
| 5,986,808 A | 11/1999 | Wang | 385/37 |
| 6,031,653 A | 2/2000 | Wang | 359/263 |

OTHER PUBLICATIONS

Wang, Yu, "Voltage–induced color–selective absorption with surface plasmons", *Appl. Phys. Lett.*, 67 (19), Nov. 6, 1995, pp. 2759–2761.

*Primary Examiner*—Hung Xuan Dang
*Assistant Examiner*—Tuyen Tra
(74) *Attorney, Agent, or Firm*—Harvey Fendelman; Michael A. Kagan; Peter A. Lipovsky

(57) ABSTRACT

Disclosed is an optical modulating device capable of use as a light-valve, display, optical filter or Fabry-Perot cavity, for example. The device lends itself to batch processing, and is compatible with monolithic integration with silicon, silicon-germanium, silicon-on-sapphire (SOS) or silicon-on-quartz (SOQ) advanced microelectronic technology (NMOS, PMOS and CMOS) for integrated control circuitry, electrical addressing, system interfacing, and the like. The device forgoes the complexities of liquid crystal constructions, and avoids the need to position and fix piezoelectric spacers within layers of the device. The invention includes first and second transparent layers that are disposed to oppose one another. Metallic layers are disposed upon the inwardly facing surfaces of the transparent layers and these are arranged to oppose each other. Spectral coupling layers are disposed upon the outwardly facing surfaces of the transparent layers opposite of the metallic layers. Electrodes are disposed upon the inwardly facing surface of the first and second transparent layers. An optical cavity is created between the metallic layers, and voltage is applied to the opposing electrodes to adjust the air gap between the metallic layers. Adjustment of this air gap permits light passing through the device to be controlled. To facilitate movement of one transparent layer with respect to another, one or more flexible portions are incorporated into at least one of the layers.

30 Claims, 3 Drawing Sheets

MICRO-DYNAMIC OPTICAL DEVICE

BACKGROUND OF THE INVENTION

This invention relates generally to the fields of optical modulators, light valves, electro-optic filters, projection and flat panel display devices. More specifically, this invention relates to an optical modulating device, light-valve display or optical filter which uses a micro-dynamic construction to exploit color-selective absorption at a metal-dielectric interface by surface plasmons.

Yu Wang (Ref 1) has reported on the phenomenon of voltage-induced color-selective absorption at a metal/liquid crystal interface with surface plasmons. The surface plasmon, a collective excitation of electrons, absorbs all incident light at the resonance frequency of the plasmon. When incident p-polarized light is absorbed at the surface plasmon resonance, the reflected light will show a color complementary to that which is absorbed.

Wang teaches that by using a liquid crystal, whose dielectric constant varies with applied voltage, one can change the resonance frequency of the surface plasmon which in turn provides a concomitant change in absorption. Changing the dielectric constant of the liquid crystal through the application of voltage results in the reflected light showing a color change.

FIG. 1 schematically shows the prior art as taught by Wang. In this figure, the projection display 10 includes a substrate 11, bottom electrode 12, alignment layers 13, spacers 14, top electrode 15, liquid crystal 16 and seal 17. Alignment layers 13, typically formed by deposition of an oxide or polyimide layer and mechanical rubbing of the surface, are required to be be employed to impart a preferred direction to the liquid crystal 16. Spacers 14 are required to set the desired spacing between top electrode 15 and bottom electrode 12. Seal 17 is required to contain liquid crystal 16 between top electrode 15 and bottom electrode 12.

In U.S. Pat. No. 5,570,139 Wang describes a similarly designed liquid crystal embodiment and how this embodiment may be employed in projection display applications. Also briefly described is the use of a solid state substitute for the liquid crystal, however a detailed design of the solid state approach is not presented.

In U.S. Pat. No. 5,986,808, Wang describes a surface plasmon tunable filter using metallic layers bordering a dielectric region with an adjustable air gap as a dielectric. Wang teaches the use of piezoelectric spacers to physically expand or contract the air gap when a voltage is applied.

Similarly, Wang, in U.S. Pat. No. 6,031,653, describes thin-film metal interference filters forming a Fabry-Perot cavity in which piezoelectric spacers are used to control an air gap between two metal films.

The complexities of liquid crystal and incorporated piezoelectric structures pose substantial limitations towards the ability to rapidly and easily manufacture optical modulating devices in great numbers and at once.

A need exists for optical modulating devices that are compatible for monolithic integration with silicon, silicon-germanium, silicon-on-sapphire (SOS) or silicon-on-quartz (SOQ) advanced microelectronic technology (NMOS, PMOS and CMOS) for integrated control circuitry, electrical addressing, system interfacing, and the like so that these may be rapidly and greatly manufactured.

SUMMARY OF THE INVENTION

The invention is a optical modulating device capable of being used as a light-valve, display, optical filter or Fabry-Perot cavity, for example. The optical device of the invention lends itself to batch processing, and is compatible with monolithic integration with silicon, silicon-germanium, silicon-on-sapphire (SOS) or silicon-on-quartz (SOQ) advanced microelectronic technology (NMOS, PMOS and CMOS) for integrated control circuitry, electrical addressing, system interfacing, and the like. The device forgoes the complexities of liquid crystal constructions, and avoids the need to position and fix piezoelectric spacers within layers of the device.

In this invention, first and second transparent layers are disposed to oppose one another. Metallic layers are disposed upon the inwardly facing surfaces of the transparent layers and these are arranged to oppose each other. Spectral coupling layers are disposed upon the outwardly facing surfaces of the transparent layers opposite of the metallic layers.

In one embodiment, electrodes are disposed upon the inwardly facing surface of the first and second transparent layers. An optical cavity is created between the metallic layers, and voltage is applied to the opposing electrodes to adjust the air gap between the metallic layers. Adjustment of this air gap permits light passing therethrough to be controlled.

In a second embodiment, electrodes are omitted, and the air gap within the optical cavity is adjusted via the application of heat to the optical device. Light is thereby controlled through the selective expansion and contraction of the air gap.

In a preferred approach to both embodiments, the metallic layers are of the same thickness and material. A surface plasmon effect is created at the interfaces of the air dielectric and metallic layers. In a well understood manner, the surface plasmon effect serves to selectively filter light transmitted through the device, so that a desired light transmission results at the output of the device.

In batch processing fabrication, the optical device of the invention may be manufactured in halves that each include a transparent layer, a metallic layer, a spectral coupling layer and an electrode, when used. The halves are later aligned in opposing couples. In this fabrication scheme, the halves may be produced in substantially the same plane.

An alternate processing design includes fabrication of the layers above, but in an opposing fashion, so that the air gap is later created such as by etching.

To facilitate movement of one transparent layer with respect to another, one or more flexible portions are incorporated into at least one of the layers. This design lends itself to batch processing construction, and avoids the aforementioned need to align and fix piezoelectric spacers such as those used in prior art inventions.

The design also avoids the requirements of liquid crystal configurations, such as seals, alignment layers and the like.

OBJECTS OF THE INVENTION

It is an object of this invention to provide an optical modulating device that lends itself to fabrication by batch processing.

A further object of this invention is to provide an optical modulating device that eliminates the use of liquid crystals.

Yet another object of this invention is to provide an optical modulating device of relatively high temperature resistance and/or operating range.

Yet a further object of this invention is to provide an optical modulating device that provides the ability to modulate high levels of light flux or fluence, such as from a laser source.

A further object of this invention is to provide an optical modulating device that is compatible for monolithic integration with silicon, silicon-germanium, silicon-on-sapphire (SOS) or silicon-on-quartz (SOQ) advanced microelectronic technology (NMOS, PMOS and CMOS).

Other objects, advantages, and new features of this invention will become apparent from the following detailed description of the invention when considered in conjunction with the accompanied drawings.

DESCRIPTION OF THE PREFERRED EMBODIMENTS

Figure 1:
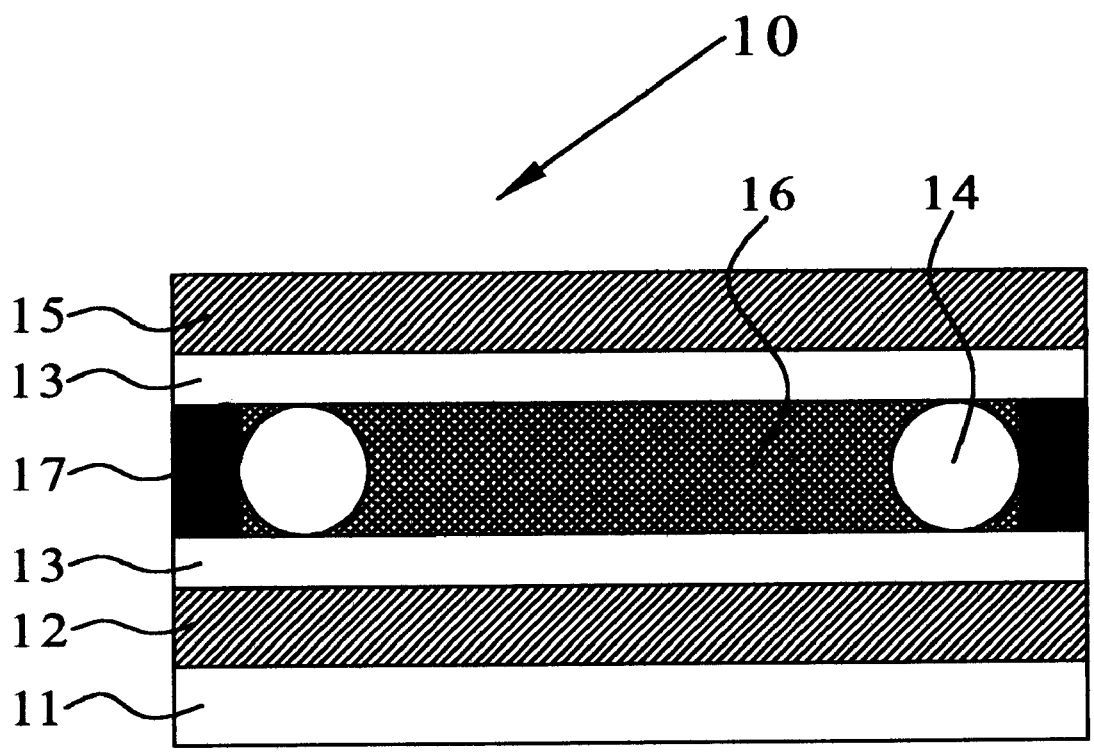
FIG. 1 is a cross-sectional side view of a liquid crystal light valve according to the prior art.
Figure 2B:
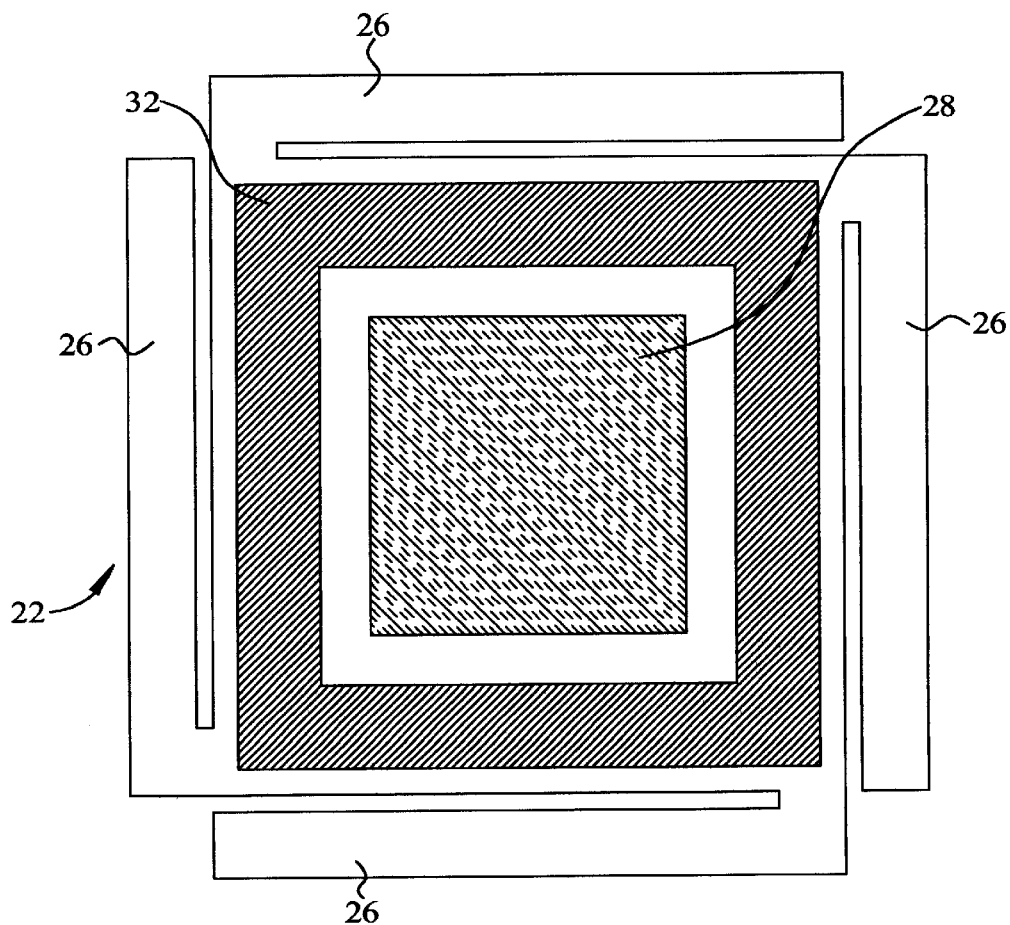
FIGS. 2A and 2B, respectively, show side views and a bottom view of a top element of the invention.
Figure 2A:
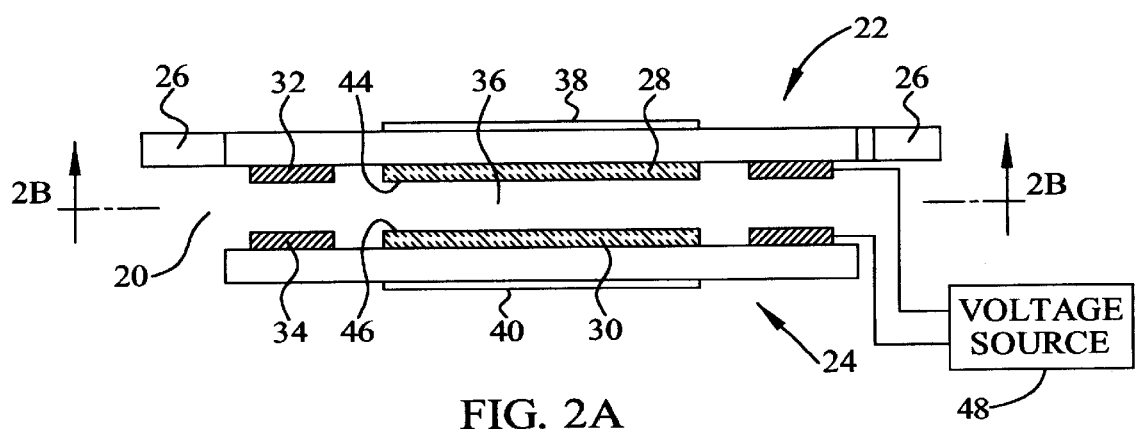

A micro-dynamic surface plasmon light valve and tunable filter 20 is shown in FIGS. 2A and 2B. These figures respectively show a side view and a bottom view of a top layer of the invention. Referring to these figures together, light valve 20 includes an upper transparent layer 22, a lower transparent layer 24, flexible spring mounts 26 made a part of transparent layer 22, an upper metallic layer 28, a lower metallic layer 30, and optional upper 32, and bottom 34 electrodes. The upper and lower halves of the invention essentially mirror each other, with the exception of the flexible mounts. While the shape of these halves are shown as being substantially square, other shapes can be envisioned. The transparent layers of the invention may be of $SiO_2$, $Al_2O_3$ as well as other suitable transparent substances. The spring elements could be of these same materials or of others that are suitably attached to one or more of the transparent layers. The metallic layers may be made of silver, aluminum, gold, rhodium or combinations of these, for example. The electrodes, for example, may be of aluminum, silver or of doped polycrystalline silicon.

Referring again to FIG. 2, a thin air gap 36 exists between the metallic layers. This air gap is created by positioning transparent layers 22 and 24 upon mounts not shown. A spectral coupling layer 38 is disposed on the outer side of upper transparent layer 22 opposite of metallic layer 28. Similarly, a spectral coupling layer 40 is disposed on the outer side of lower transparent layer 24 opposite of metallic layer 30. In both instances, spectral coupling layers 38 and 40 may include diffraction gratings, for example, or may include prisms.

Figure 3:
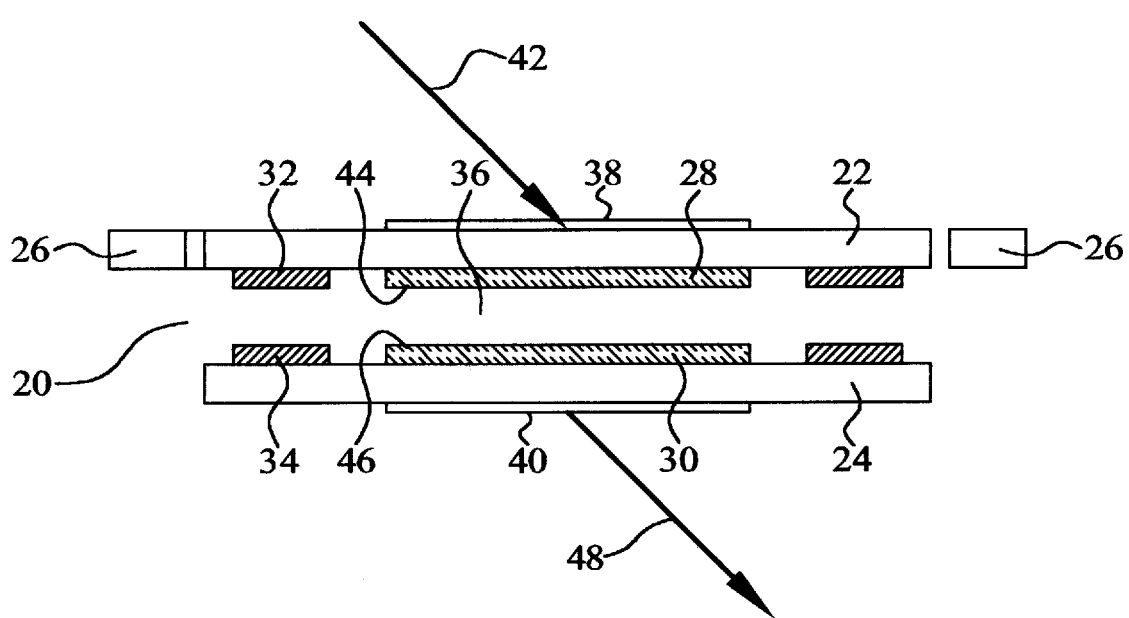
FIG. 3 is an illustration like FIG. 2A wherein the transmission of light through the invention is illustrated.

Referring to FIG. 3, a transmissive mode of operation of the invention will be described by way of example. In this transmissive mode, incident electromagnetic radiation 42, for example visible light, will be at least partially transmitted through top spectral layer 38 to impinge upon interface 44 between air gap 36 and upper metallic layer 28. A surface plasmon wave excited at this interface enables the energy of the resonance photons to be converted into the free electrons of the upper metallic layer 28. The optical field will transverse air gap 36 and excite another surface plasmon wave with the same frequency at interface 46, providing that the metallic layers are of the same thickness and material. The resonance photons will then be re-radiated out as desired light 48.

By applying a voltage to electrodes 32 and 34 from a variable voltage source 48, as shown in FIG. 2, electrostatic forces can be used to pull the electrodes together. The air gap 36 will thereby be changed with the applied voltage. Concomitantly, a change in the peak transmission (wavelength) of the output light will take place.

Similarly, in the embodiment of the invention in which heat is used to change the air gap, the peak transmission will be likewise changed. This heat can be applied by integrated microstrip heaters, laser diodes, or the like, for example.

This invention provides an improved design for surface plasmon devices by eliminating the need for the spacers, alignment layers and seals previously used to make liquid crystal surface plasmon devices. Piezoelectric spacers, and their accompanying concerns, are also done away with. The micro-dynamic device also provides for improved temperature resistance and operating range for the device when compared to liquid crystals. Importantly, the device provides the ability to modulate high levels of light flux or fluence, for example from a laser source. Another advantage is that the optical device of the invention can be optically modulated several orders of magnitude faster than the prior art nematic liquid crystals which typically switch on the order of tens to hundreds of milliseconds.

The fabrication of the surface plasmon light valve and filter of the current invention also provides for compatibility for monolithic integration with silicon, silicon-germanium, silicon-on-sapphire (SOS) or silicon-on-quartz (SOQ) advanced microelectronic technology (NMOS, PMOS and CMOS) for integrated control circuitry, electrical addressing, system interfacing, and the like.

REFERENCES (1) Y. Wang, "Voltage-induced color-selective absorption with surface plasmons," Applied Physics Letters, Vol. 67, No. 19, Nov. 6, 1995, pp. 2759–2761.

Obviously, many modifications and variations of the invention are possible in light of the above teaching. It is therefore to be understood that within the scope of the appended claims the invention may be practiced otherwise than as has been specifically described.

What is claimed is:

1. A light valve comprising:
    first and second transparent layers, said layers disposed to oppose one another and thereby have inwardly facing surfaces and outwardly facing surfaces;
    first and second metallic layers, one such metallic layer disposed upon a portion of said inwardly facing surface of said first transparent layer and the other said metallic layer disposed upon a portion of said inwardly facing surface of said second transparent layer wherein said metallic layers are disposed to oppose each other; and
    first and second spectral coupling layers, one such spectral coupling layer disposed upon said outwardly facing surface of said first transparent layer opposite of said first metallic layer and the other said spectral coupling layer disposed upon said outwardly facing surface of said second transparent layer opposite of said second metallic layer;
    wherein said metallic layers are spaced-apart to create an air gap therebetween, said metallic layers and said air gap creating an optical cavity through which light is selectively transmitted, and wherein said air gap is adjustable upon an application of heat to said layers so that light passed through said optical cavity is controlled.

2. The light valve according to claim 1 wherein said light valve is produced in batch processing.

3. The light valve according to claim 1 wherein said light valve is produced through batch processing in which said light valve is manufactured in halves each including a said transparent layer, a said metallic layer, and a said spectral coupling layer, wherein said halves are then aligned in opposing couples.

4. The light valve according to claim 3 wherein said halves are fabricated in substantially the same plane.

5. The light valve according to claim 1 wherein surface plasmon resonance is generated at each of the interfaces of said metallic layers and said air gap.

6. The light valve according to claim 1 wherein said metallic layers are of the same metal and thickness.

7. The light valve according to claim 1 wherein a change in said air gap has the effect of changing the wavelength of said light transmitted through said optical cavity.

8. The light valve according to claim 1 wherein said coupling layers include diffraction gratings.

9. The light valve according to claim 1 wherein said metallic layers are silver.

10. The light valve according to claim 1 wherein said metallic layers are each a combination of metal layers.

11. The light valve according to claim 1 wherein said metal layers are chosen from the group of Al, Ag, Au and Rh.

12. The light valve according to claim 1 wherein said first transparent layers is movable with respect to said second transparent layer, said first transparent layer including integral flexible mounts to enable said air gap to lessen or enlarge.

13. The light valve according to claim 12 wherein said flexible mounts each include a cantilever.

14. The light valve according to claim 12 wherein said light valve is produced through batch processing.

15. A light valve comprising:

first and second transparent layers, said layers disposed to oppose one another and thereby have inwardly facing surfaces and outwardly facing surfaces;

first and second metallic layers, one such metallic layer disposed upon a portion of said inwardly facing surface of said first transparent layer and the other said metallic layer disposed upon a portion of said inwardly facing surface of said second transparent layer wherein said metallic layers are disposed to oppose each other;

first and second spectral coupling layers, one such spectral coupling layer disposed upon said outwardly facing surface of said first transparent layer opposite of said first metallic layer and the other said spectral coupling layer disposed upon said outwardly facing surface of said second transparent layer opposite of said second metallic layer; and first and second electrodes, one such electrode disposed upon a portion of said inwardly facing surface of said first transparent layer and the other said electrode disposed upon a portion of said inwardly facing surface of said second transparent layer wherein said electrodes are disposed to oppose each other;

wherein said metallic layers are spaced-apart to create an air gap therebetween, said metallic layers and said air gap creating an optical cavity through which light is selectively transmitted, and wherein said air gap is adjustable upon an application of voltage to said electrodes so that light passed through said optical cavity is controlled.

16. The light valve according to claim 15 wherein said light valve is produced in batch processing.

17. The light valve according to claim 15 wherein said light valve is produced through batch processing in which said light valve is manufactured in halves each including a said transparent layer, a said metallic layer, a said spectral coupling layer and a said electrode, wherein said halves are then aligned in opposing couples.

18. The light valve according to claim 17 wherein said halves are fabricated in substantially the same plane.

19. The light valve according to claim 15 wherein surface plasmon resonance is generated at each of the interfaces of said metallic layers and said air gap.

20. The light valve according to claim 15 wherein said metallic layers are of the same metal and thickness.

21. The light valve according to claim 15 wherein a change in said air gap has the effect of changing the wavelength of said light transmitted through said optical cavity.

22. The light valve according to claim 15 further including a variable voltage supply connected to said first and second electrodes so that said electrodes may be selectively drawn together by application of voltage thereto to change said air gap and thereby alter a characteristic of said light transmitted through said optical cavity.

23. The light valve according to claim 22 wherein said characteristic of said light is wavelength.

24. The light valve according to claim 15 wherein said coupling layers include diffraction gratings.

25. The light valve according to claim 15 wherein said metallic layers are silver.

26. The light valve according to claim 15 wherein said metallic layers are each a combination of metal layers.

27. The light valve according to claim 15 wherein said metal layers are chosen from the group of Al, Ag, Au and Rh.

28. The light valve according to claim 15 wherein said first transparent layers is movable with respect to said second transparent layer, said first transparent layer having integral flexible mounts to enable said air gap to lessen or enlarge according to application of said voltage.

29. The light valve according to claim 28 wherein said flexible mounts each include a cantilever.

30. The light valve according to claim 28 wherein said light valve is produced through batch processing.

* * * * *